United States Patent [19]

Sato et al.

[11] Patent Number: 5,677,740
[45] Date of Patent: Oct. 14, 1997

[54] VIDEO RECEIVER FOR STORING COMPRESSED AND ENCODED AUDIO-VISUAL DATA

[75] Inventors: Kazuma Sato; Hiroshi Tanaka, both of Tsurugashima, Japan

[73] Assignee: Toko, Inc., Japan

[21] Appl. No.: 517,108

[22] Filed: Aug. 18, 1995

[30] Foreign Application Priority Data

Aug. 31, 1994 [JP] Japan ..................................... 6-230622

[51] Int. Cl.$^6$ .............................. H04N 5/44; H04N 9/64
[52] U.S. Cl. ....................... 348/553; 348/719; 348/714
[58] Field of Search ...................................... 348/553, 714, 348/719, 720, 512, 516, 518, 423; H04N 5/44, 9/64, 9/475

[56] References Cited

U.S. PATENT DOCUMENTS 5,227,876  7/1993  Cucchi .

Primary Examiner—Sherrie Hsia
Attorney, Agent, or Firm—Londa and Traub LLP

[57] ABSTRACT

A video receiver including an interface to which compressed and encoded video-audio data is supplied from a transmission line and stored in the receiver, a decoder for decoding the video-audio data retrieved from storage, a monitor for connecting to the decoder and a CPU for controlling data processing. A common buffer memory for temporarily storing the video-audio data is provided between the interface and the decoder and between the interface and the storage device and, while the video-audio data is being received, access to the buffer memory is subjected to time-shared, exclusive control by the CPU in synchronism with the clock frequency of the transmission line, whereby video data is read out of the buffer memory by the decoder in parallel with the storage of the video-audio data, and is thereby decoded so that a picture is viewed on the monitor.

3 Claims, 2 Drawing Sheets

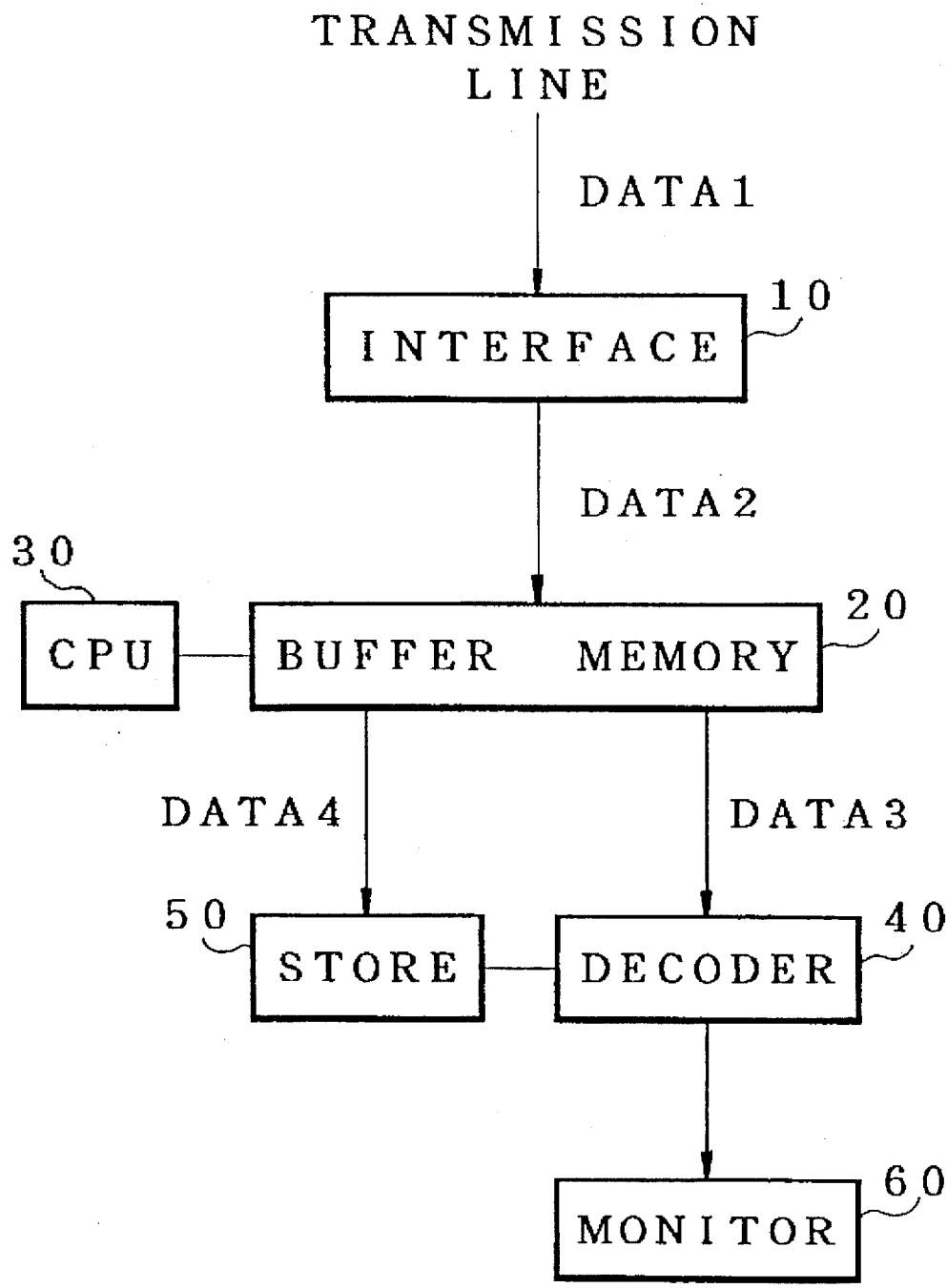

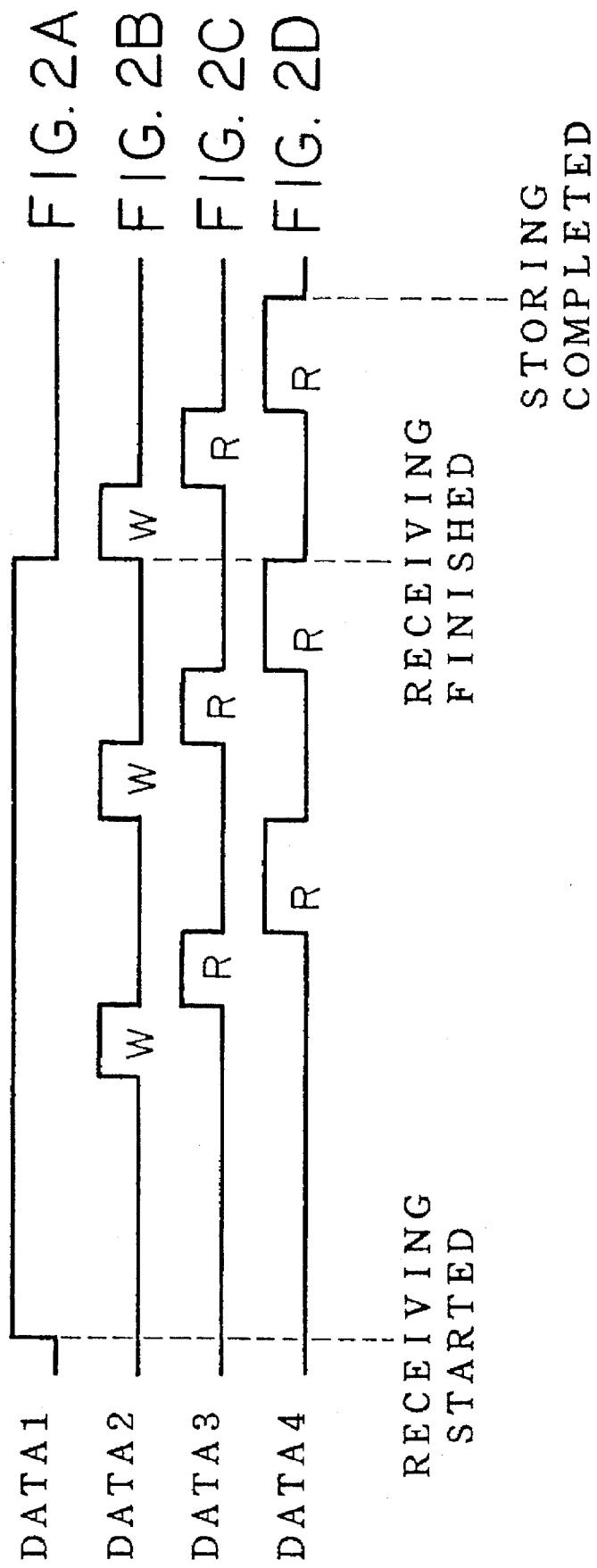

VIDEO RECEIVER FOR STORING COMPRESSED AND ENCODED AUDIO-VISUAL DATA

BACKGROUND OF THE INVENTION

1. Field of the Invention

This invention relates to a video receiver which is designed such that video and audio data as transmitted in compressed and encoded form are stored in store means and then decoded to be converted to a television signal.

2. Description of the Prior Art

In a conventional video receiver provided with a codec apparatus, the design is made such that video and audio data, which are received moment by moment, are stored in store means, and then decoded to be converted to a television signal after reception of successive data has been completed. To produce a clear picture, a high encoding rate is usually employed. However, difficulties may sometimes be encountered in an attempt to make equal the encoding rate, transmitting rate and decoding rate, due to the fact that the transmitting rate is limited by the communication situation or the like at the news collecting site. With such a conventional apparatus, the transmitting rate, decoding rate, and storing rate for the store means are different; thus, the arrangement is not made such that the picture as received is displayed instantly.

A time period far longer than the length of the received data is taken from the point of time when reception is started until the point of time when the contents of the received data can actually be observed on a monitor screen, though it varies depending on the encoding rate of the data. In the case where data with an encoding rate of 1.5 Mbps is transmitted at a transmitting rate of 64 Kbps, for example, 1.5 Mbps÷64 Kbps=23.4; thus, the transmission time period turns out to be about 24 times as long as the length of the received data. It will be seen that about 72 minutes will be taken from point of time when reception of video-audio data of 3 minutes is started until the point of time when such data is viewed on a television monitor.

Thus, the above-mentioned conventional arrangement is disadvantageous in that even though the video data as received is unwanted at the receiving site, it cannot be determined until after the reception of the data is over and the data is viewed on a monitor; thus, wasteful transmission and reception are made using expensive transmission circuits.

SUMMARY OF THE INVENTION

It is an object of the present invention to provide a video receiver wherein compressed and encoded video-audio data are stored, the apparatus being equipped with the function for making it possible to monitor a received picture upon reception thereof, even if the video-audio data are ones which were transmitted with a transmission rate different from the encoding rate.

Briefly, according to the present invention, there is provided a video receiver comprising an interface to which compressed and encoded video-audio data are supplied at a predetermined transmission rate through a transmission line; store means storing video-audio data derived from the interface; decoder means for decoding the video-audio data derived from the store means; a monitor connected to the decoder means; and a CPU for controlling data processing, characterized in that a common buffer memory adapted to temporarily store the video-audio data is provided between the interface and the decoder means and between the interface and the store means; and during reception of the video-audio data, access to the buffer memory is subjected to time-shared exclusive control by the CPU, in synchronism with the clock frequency of the transmission line, whereby video data is read out of the buffer memory by the decoder means in parallel with the storing of the video-audio data into the store means and thereby decoded so that a picture is viewed on the monitor.

Other objects, features and advantages of the present invention will become apparent from the ensuing description taken in conjunction with the accompanying drawings.

BRIEF DESCRIPTION OF THE DRAWINGS

FIG. 1 is a block diagram showing the video receiver according to an embodiment of the present invention.

FIG. 2A represents compressed and encoded video-audio data supplied from a transmission line;

FIG. 2B represents the data from FIG. 2A after error correction;

FIG. 2C represents data inputted to the decoder; and

FIG. 2D represents data inputted to storage.

DESCRIPTION OF THE PREFERRED EMBODIMENTS

Referring to FIG. 1, there is shown the video receiver according to an embodiment of the present invention. Description will now be made of the case where video-audio data as encoded with an encoding rate of 1.5 Mbps is received through a transmission line with a transmission rate of 64 Kbps.

Compressed and encoded video-audio data 1 is continuously supplied from the transmission line to an interface 10 with a bit rate of 64 Kbps. Any error introduced in the data is corrected at the interface, and thus after having been subjected to the error correction, the video-audio data 2 is applied to the buffer memory 20, which is arranged to distribute data 2 to the decoder 40 and store 50 under the control of CPU 30.

To discriminate one data flow from another, data inputted to the decoder 40 is referred to as data 3, and data inputted to the store 50 is termed data 4, though such data are substantially identical with the data 2. The CPU 30 controls, on a time-shared, exclusive basis as shown in FIGS. 2A–2D, the process of writing and reading of the data 2, 3 and 4 in synchronism with the clock frequency 64 KHz of the transmission line. In FIGS. 2B–2D, the reference symbol W indicates write operation, and R denotes read operation.

As will be seen from FIGS. 2A–2D, after reception of the data 1 has been started, the data 2 is written in the buffer memory 20, and thereupon the decoder 40 reads out the data 3. The system is controlled by the CPU 30 such that the decoder 40 is permitted to read out the data 3 after it has been detected that one or more frames of video data 2 have been inputted to the buffer memory 20. As the data 3, video data alone is taken out of the video-audio data 2. After having been decoded in the decoder 40, the data 3 is successively applied to the monitor 60 so as to be displayed thereon. Due to the fact that one or more frames of data 2 are slow to be stored in the buffer memory 20, the video data to be outputted to the monitor 60 becomes short, but the frame shortage is coped with by sending out the same video frame repeatedly.

Let it be assumed that the ratio of the bit rate of the process in the decoder 40 to the transmission rate of the transmission line is K. Then, in the case of this example, K=(1.5 Mbps/64 Kbps)=23.4; thus, the maximum number of the same picture frames turns out to be 24. Consequently, an intermittently moving picture will be viewed on the monitor 60, but that will be sufficient to determine the contents of the received data.

At a time point when the reading of the data 3 by the decoder 40 was completed, the data 4 is read by the store 50 and stored therein. At a time point when the reading of the data 4 was finished, new data 2 is again written in the buffer memory 20, and the foregoing operations are repeated. The data 4 read by the store 50 is successively stored therein. At a time point when the receiving of the data 1 was finished, the data processing will be completed after one cycle of the operation subsequent to the data 2 being written in the buffer memory 20. All the data 2 as received are stored in the store 50, and the video data taken out of the store 50 after data reception has been finished, are decoded at the decoder 40 and viewed on the monitor 60.

With the prior-art arrangement, even data having a time length of 3 minutes could not be viewed until after a time period of one ore more hours has elapsed. In contrast thereto, according to the present invention, the contents of the data as received can be instantly determined; and if the video data as received is unwanted, then the situation can be quickly coped with by having the transmission ceased at once, for example, so that waste of time and cost can be minimized.

While the present invention has been illustrated and described with respect to specific embodiments thereof, it is to be understood that the present invention is by no means limited thereto but encompasses all changes and modification which will become possible within the scope of the appended claims.

We claim:

1. A video receiver including an interface to which compressed and encoded video-audio data is supplied at a predetermined transmission rate through a transmission line, a store means for storing the video-audio data derived from said interface, a decoder means for decoding the video-audio data taken out of said store means, a monitor connected to said decoder means, and a CPU for controlling data processing, the improvement comprising:

a common buffer memory for temporarily storing the video-audio data, said common buffer memory being provided between said interface and said decoder means and between said interface and said store means, wherein while said video-audio data is being received, access to the buffer memory is subjected to time-shared, exclusive control by said CPU in synchronism with clock frequency of said transmission line, whereby video data is read out of said buffer memory by said decoder means in parallel with the storing of the video-audio data into said store means and thereby decoded so that a picture is viewed on said monitor.

2. A video receiver according to claim 1, wherein decoding operation of said decoder means is performed only when the video data is being supplied from said buffer memory thereto.

3. A video receiver according to claim 2, wherein where K represents the ratio of bit rate with which process is effected in said decoder means to transmission bit rate of said transmission line, identical frames substantially equal in number to K are successively outputted onto said monitor in parallel with reception of the video-audio data from said transmission line.

* * * * *